United States Patent

Turkish

[15] 3,701,949

[45] Oct. 31, 1972

[54] WIDEBAND FREQUENCY SCANNING RADIO RECEIVER

[72] Inventor: Sidney Turkish, Dix Hills, N.Y.

[73] Assignee: Cutler-Hammer, Inc., Milwaukee, Wis.

[22] Filed: March 22, 1971

[21] Appl. No.: 126,476

[52] U.S. Cl. ....................................325/332, 325/335

[51] Int. Cl. ............................................H04b 1/36

[58] Field of Search..............325/332, 335, 418, 433; 324/77 B, 77 C, 77 CS; 331/178

[56] References Cited

UNITED STATES PATENTS

| | | | |
|---|---|---|---|
| 3,449,749 | 6/1969 | McEvoy | 324/77 |
| 3,382,460 | 5/1968 | Blitz et al | 325/335 |
| 3,434,057 | 3/1969 | Jackman et al | 325/335 |
| 2,971,152 | 2/1961 | Ranky | 324/77 |
| 3,366,877 | 1/1968 | Kinkel et al. | 324/77 |

*Primary Examiner*—Robert L. Griffin
*Assistant Examiner*—Barry L. Leibowitz
*Attorney*—Henry Huff

[57] ABSTRACT

A superheterodyne system utilizing successive harmonics of an electrically tunable local oscillator, which is repeatedly swept over a frequency range of about one octave or less, to scan throughout a radio frequency range of several octaves in a substantially continuous manner.

4 Claims, 9 Drawing Figures

INVENTOR.
SIDNEY TURKISH

BY

Henry Huff
ATTORNEY

COUNT SENSE

FF STATE

PRESELECTOR SWEEP VOLTAGE

LO SWEEP VOLTAGE

IF GAIN

MIXER BIAS

BLANKING

INVENTOR.
SIDNEY TURKISH

BY

ATTORNEY

WIDEBAND FREQUENCY SCANNING RADIO RECEIVER

BACKGROUND

1. Field

This invention pertains to panoramic radio receivers, otherwise known as frequency scanning receivers. Such a receiver, when equipped with oscillographic display means, is usually called a spectrum analyzer.

2. Prior Art

Frequency scanning superheterodyne receivers per se are well known. With the development of modern microwave devices, the use of such receivers has been extended into the frequency range up to say forty GHz. In this range, the sweep width capability of existing devices that are otherwise suitable as local oscillators is limited to about one octave. To cover a range of more than one octave, receivers are designed to use different harmonics of the local oscillator as mixer signals for scanning different bands of the frequency range desired. This technique as heretofore used does not enable continuous scanning over the entire range without band switching, and introduces several undesirable characteristics in the overall operation of the receiver, including ambiguous frequency indications, spurious responses, variations in gain, and leakage of local oscillator signal to the receiver input circuit.

SUMMARY

According to this invention, a timing device is arranged to drive a sweep wave generator which controls the frequency of a local oscillator to sweep in succession through ranges in which successive harmonics of the oscillator output are used as mixer signals for converting RF input signals to IF signals. It is intended that the term "harmonics" as used herein may include the first harmonic, or fundamental, as well as higher order harmonics.

The local oscillator harmonics, other than the first, are generated in the mixer, which is arranged to enhance the desired harmonics while inhibiting generation of RF signal harmonics. Mixer bias and IF gain are automatically adjusted according to the harmonic in use.

The timing device may consist of a clock pulse generator and counter arranged to provide control pulses at appropriate times during the scanning cycle. A second sweep generator is driven by the timing device to control an electrically tunable preselector to sweep over the RF scanning range, and may also drive the horizontal deflection circuit of a cathode ray oscilloscope. To provide a sensibly continuous RF spectrum display without gaps or perceptible discontinuities, the second sweep generator is made to stop or retrace slightly during the brief periods while the local oscillator sweep generator is reset before its next sweep. The preselector prevents spurious responses such as images and undesired harmonic products, isolates the local oscillator from the RF input, and prevents strong RF signals from obscuring the presence of weak signals at nearby frequencies.

DRAWINGS

DESCRIPTION

Figure 1:
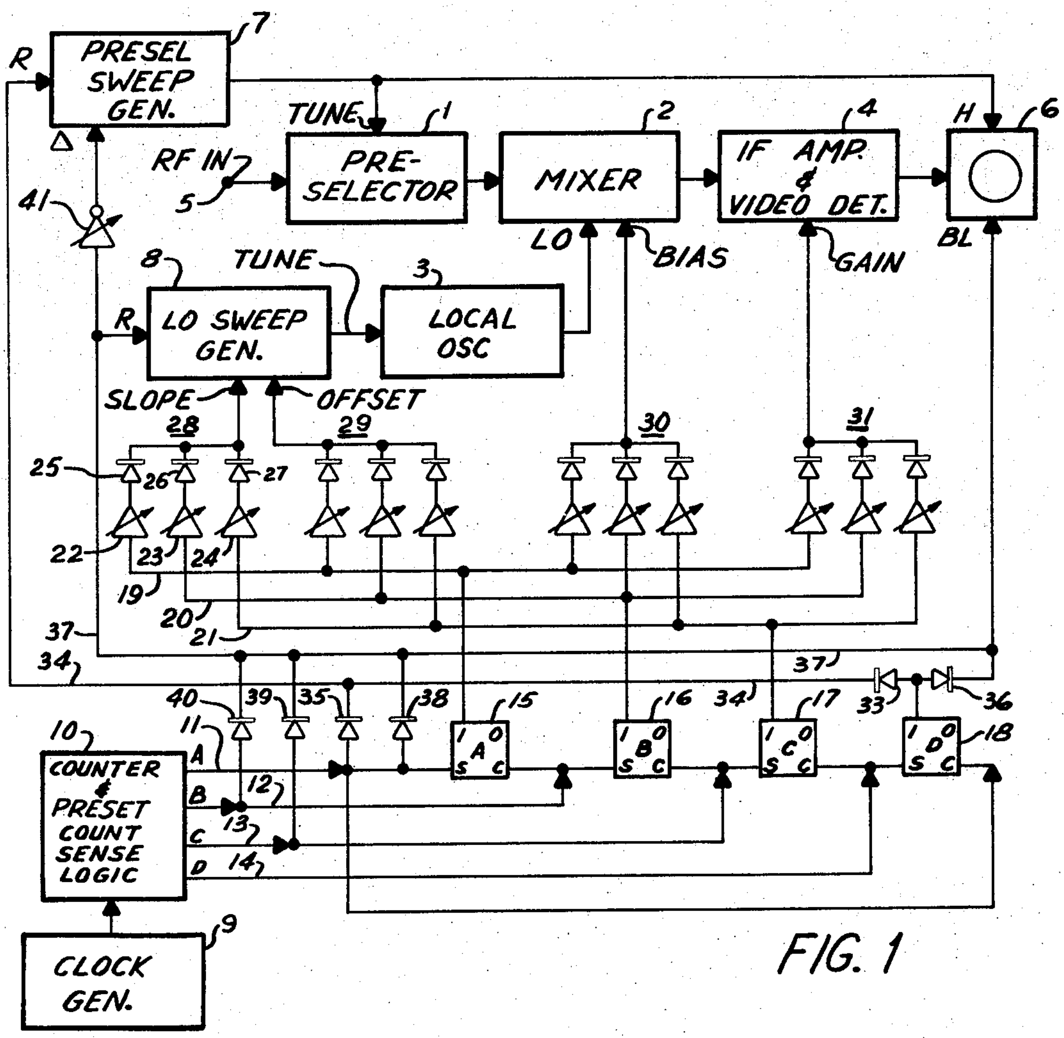
FIG. 1 is a schematic block diagram of a wideband radio spectrum analyzer embodying the invention.

Referring to FIG. 1, the illustrated preferred embodiment of the invention includes the basic elements of a super-heterodyne receiver, consisting of a preselector 1, a mixer 2, a local oscillator 3 and an IF amplifier and detector 4, connected in usual manner to accept RF input signals at terminal 5, convert their frequencies to an intermediate frequency (IF), and amplify and detect the converted signals. The IF amplifier is a bandpass device, with a passband of say 1 MHz wide, centered at 200 MHz, for example. The detected output is applied to the vertical deflection circuit of a cathode ray oscilloscope 6.

The preselector 1 is an electrically-tunable bandpass filter that will reject all RF signals except those of frequencies within a relatively narrow passband centered on a frequency determined by the magnitude of a tuning control input voltage. Suitable known devices for this purpose use yttrium-iron-garnet (YIG) crystals as resonant elements in the RF signal path. The resonant frequency of such a crystal is linearly proportional to the strength of a magnetic field applied to it, and hence to the current passed through an inductive coil to produce the field.

The preselector 1 contains suitable known means for producing a magnetizing field current proportional to the tuning control voltage, effectively making the preselector a voltage-tuned device. Voltage-controlled filters of this type are readily tunable throughout a microwave frequency range of several octaves.

Tuning control voltage for the preselector is provided by a sweep wave generator 7, which is connected also to the horizontal deflection circuit of the oscilloscope 6. The sweep generator 7 is a circuit of known type, consisting of a capacitor and an operational amplifier arranged to produce an output voltage that increases linearly as a function of time until stopped by a reset signal applied to a terminal designated R in the drawing. The reset signal returns the sweep voltage to its starting level, from which another sweep cycle begins when the reset is removed. Another terminal, designated Δ, is connected to add algebraically any voltage applied to it, to the existing sweep voltage. A negative going pulse of appropriate magnitude at terminal Δ produces a momentary pause or a "mini retrace" in the sweep, without reset to the starting level.

The local oscillator 3 is of a known type, with a voltage-tunable YIG-resonator arrangement similar to a preselector resonator. The active element of the oscillator will operate only through a range of microwave frequencies of about one octave, however.

Tuning control voltage for the oscillator 3 is provided by a sweep wave generator 8, which is similar to sweep generator 7 but has two auxiliary inputs designated "slope" and "offset." The offset input is arranged, like the Δ input of sweep generator 7, to add algebraically to the basic sweep wave. The slope input controls the rate of change of the sweep voltage, as by setting the level of the d-C supply from which it is generated, or by controlling the gain of an amplifier connected to the actual wave generator.

A clock pulse generator 9 supplies timing pulses at a repetition rate of, say 1000 per second, to a counter and preset count sense logic circuit 10. The circuit 10 may be a known arrangement of a multistage binary counter with AND gates connected to the various counter stages so as to provide respective outputs in response to certain preset or preselected counts. For example, a five stage binary counter driven by the clock pulse generator 9 will assume in succession thirty two different conditions, corresponding to binary numbers 00000 to 11111, each persisting for one clock pulse period, i.e. 1 millisecond.

Figure 3:
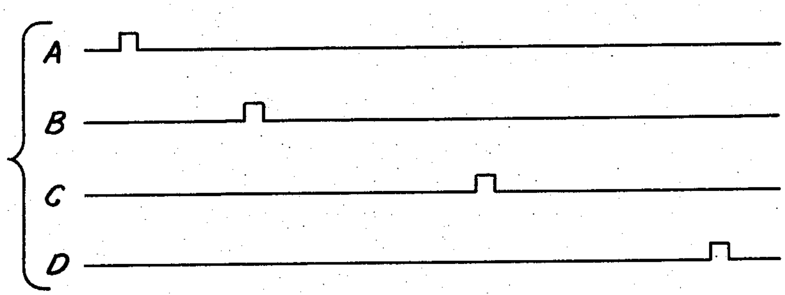
FIGS. 3A through 3D are graphical illustrations of count sense or control pulses occuring in the operation of the system of FIG. 1.

In the present example, the AND gates are connected to sense the first, seventh, eighteenth and twenty-ninth counts, corresponding to binary counter states 00001, 00111, 10010, and 11101, and provide one millisecond positive-going pulses A, B, C and D (see FIG. 3) on respective output lines 11, 12, 13 and 14 as the preset counts are attained. The binary counter recycles automatically, reaching state 00000 with the thirty-second clock pulse and then repeating the sequence.

Four bistable multivibrators 15, 16, 17 and 18, of the type commonly called flip flops, are arranged as shown, with their set input terminals, indicated in each case by the letter S, connected to the count sense output lines 11, 12, 13 and 14 respectively, and their clear input terminals, indicated by the letter C, to count sense output lines 12, 13, 14 and 11 respectively. For this explanation, the leading edge of a positive-going pulse applied to the set input terminal of a flip flop will cause the "1" output terminal to be energized at a positive voltage level, simultaneously causing the "0" output terminal to be deenergized. The flip flop remains in its set, or "1" state until a positive going pulse is applied to the clear input terminal. The leading edge of such pulse causes the "1" output terminal to be deenergized, and the "0" output terminal to be energized, and the flip flop remains in its clear or "0" state until the next set input pulse is applied.

Figure 4:
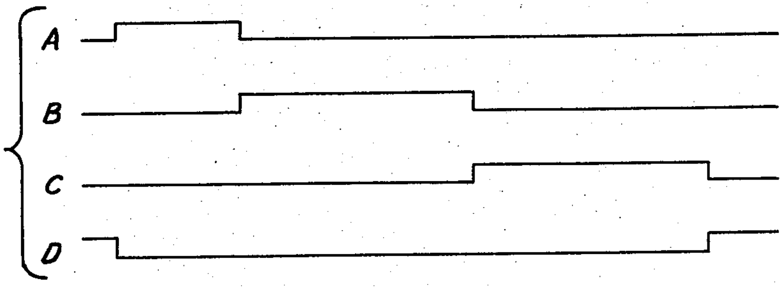
FIGS. 4A through 4D represent the states of respective flip flops during operations.

Flip flops 15, 16, 17 and 18 are also designated A, B, c and D respectively in accordance with the pulses on lines 11–14 which set them. Referring to FIG. 4, flip flops A, B, C and D are set by the leading edges of pulses A, B, C and D, are cleared by the leading edges of pulses B, C, D and A respectively. Denoting the times of occurrence of the leading edges as $T_A$, $T_B$, $T_C$ and $T_D$, flip flop A is set during the interval from $T_A$ to $T_B$, flip flop B from $T_B$ to $T_C$, and so on.

Only one flip flop is set at any time, all others remaining in their clear or "0" state. With the above described count selection, flip flop A is set for 6 milliseconds, then B is set for 11 milliseconds, then C is set for 11 milliseconds, then D is set for 4 milliseconds, then the cycle is repeated.

Returning to FIG. 1, the "1" output terminals of flip flops 15, 16 and 17 are connected to lines 19, 20 and 21, placing each at a positive voltage level during the time the corresponding flip flop is set. Lines 19, 20 and 21 are connected to level setting devices such as adjustable gain d-c amplifiers 22, 23 and 24, and thence through unilaterally conductive diodes 25, 26 and 27 to the slope control input terminal of the local oscillator sweep generator 8.

The assembly of amplifiers 22, 23 and 24 are diodes 25, 26 and 27 is generally designated in FIG. 1 by the underlined reference character 28. Lines 19, 20 and 21 are connected through a similar assembly 29 to the offset control input terminal of the local oscillator sweep generator 8, and through other similar assemblies 30 and 31 to the bias control input terminal of mixer 2 and the gain control input terminal of IF amplifier-detector 4.

The "1" output terminal of flip flop 18 is connected through a diode 33 to line 34, which extends to the reset input terminal of the preselector sweep generator 7. Line 11, which carries the "A" pulse, is also connected to line 34 through a diode 35. The "1" output of flip flop 18 also goes through a diode 36 to line 37, extending to the reset terminal of local oscillator sweep generator 8. Lines 11, 12 and 13, carrying pulses A, B, and C, are connected to line 37 through diodes 38, 39 and 40.

Line 37 is connected to the Δ input terminal of preselector sweep generator through an adjustable d-c amplifier 41 which is similar to amplifiers 22 – 24 but arranged to provide an output of inverted (negative) polarity, as indicated by the small circle adjacent the point of the symbol. Line 37 is also connected to a blanking control input BL of the oscilloscope 6, which is arranged to turn off the cathode ray beam in response to a positive voltage.

In the operation of the system of FIG. 1, the leading edge of the "A" pulse sets flip flop 15, energizing line 19, and clears flip flop 18. Line 37, which had been energized by flip flop 18, remains energized until the end of the "A" pulse, which reaches line 37 through diode 38.

Energization of line 19 actuates amplifier 22 of assembly 28, applying a d-c bias to the slope control input of local oscillator sweep generator 8. This bias persists as long as flip flop 15 remains set, and its level is adjusted to provide the sweep slope required for that part of the operating sequence by adjustment of the gain of amplifier 22. The corresponding amplifiers of assemblies 29, 30 and 31 similarly apply appropriate d-c levels to the offset control input of local oscillator sweep generator 8, bias input of mixer 2 and gain control input of IF AMPLIFIER-detector 4.

Figure 5:
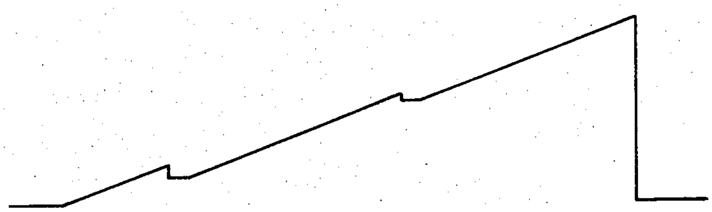
FIG. 5 is a graphical representation of the preselector sweep voltage during a scanning cycle of the system of FIG. 1.
Figure 6:
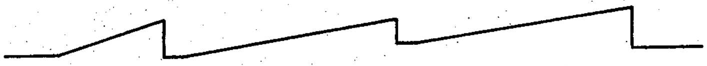
FIG. 6 is a graphical representation of the local oscillator sweep voltage.
Figure 7:
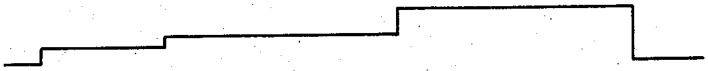
FIG. 7 shows the variations in IF gram of the system of FIG. 1, as controlled during the scanning cycle.
Figure 8:
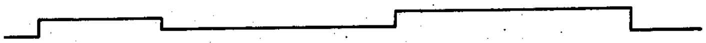
FIG. 8 illustrates variations of the d-c mixer bias as controlled during the scanning cycle.
Figure 9:
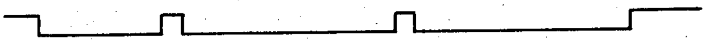
FIG. 9 represents the blanking signal applied to the display device in the operation of the system of FIG. 1.

Deenergization of line 37 at the end of the "A" pulse deenergizes the reset input terminals of both sweep generators 7 and 8, and terminates blanking of the oscilloscope 6. The preselector and local oscillator sweep voltages begin to increase linearly, as shown in FIGS. 5 and 6. The slope of the preselector sweep voltage wave is predetermined in the design and initial adjustment of the sweep generator 7 to provide the desired rate of change of frequency of the preselector 1, the slope of the local oscillator sweep voltage wave is set to the required value by adjustment of amplifier 22. Adjustment of the corresponding amplifier of assembly 29 sets the voltage from which the local oscillator sweep starts; the step preceding the beginning of the sweep in FIG. 6 represents the offset.

Figure 2:
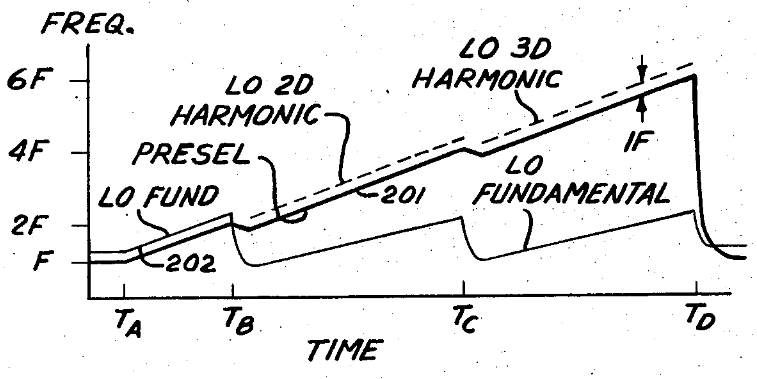
FIG. 2 is a graphical representation of local oscillator and preselector tuning frequencies as a function of time during a scanning cycle of the system of FIG. 1.

Referring to FIG. 2, line 201 represents the preselector passband center frequency as a function of time, starting when the preexisting reset signal is removed, 1 millisecond after $T_A$. The linear sweep begins at its lowest frequency F and continues until time $T_B$, when the preselector frequency is at 2F. As a typical example, F may be 2 GHz, and the rate of change of frequency is 400 MHz per millisecond.

During the same interval the local oscillator frequency, as shown by line 202, is swept in such manner that it is always higher than the preselector frequency by an amount equal to the intermediate frequency. Assuming the *IF* to be 200 MHz, the local oscillator frequency is 2.2 GHz at the start of the linear portion of the sweep, and 4.2 GHz at time $T_B$. This range is slightly less than one octave, and only moderately less than the sweep range capability of currently existing microwave oscillators. Any RF input signal at terminal 5 of a frequency within the range of 2 to 4 GHz will be accepted by the preselector 1 during a brief interval between $T_A$ and $T_B$ while the preselector passband sweeps through that frequency, converted to if in mixer 2, amplified and detected, and displayed on the screen of oscilloscope 6 in usual manner.

At time $T_B$, the leading edge of the "B" pulse clears the "A" flip flop 15 and sets the "B" flip flop 16, deenergizing line 19 and energizing line 20. Amplifier 23 of assembly 28, and the corresponding amplifiers of assemblies 29, 30 and 31 are activated. The gains of these amplifiers are so adjusted that the slope and offset control inputs to the local oscillator sweep generator, the mixer bias, and the IF gain control assume values appropriate to operation with the second harmonic of the local oscillator.

The offset is such as to make the local oscillator sweep begin, at the end of the reset provided by the "B" pulse on line 37, at a level that tunes the local oscillator to slightly below 2.1 GHz, that is, one half the frequency attained at the end of the first linear sweep. The slope is such that the rate of change of local oscillator frequency is 200 MHz per millisecond or one half that between $T_A$ and $T_B$.

The mixer bias is adjusted to optimize the conversion efficiency with regard to the local oscillator second harmonic, and the IF gain is adjusted to compensate for the difference between the fundamental and second harmonic conversion efficiencies, to maintain the overall receiving gain constant. These and similar adjustments of the other amplifiers of assemblies 30 and 31 are readily effected by observing the oscilloscope display while RF input signals of appropriate known frequencies and amplitudes are applied to input terminal 5.

Returning to FIG. 2, the preselector passband center frequency decreases slightly during the "B" pulse, then resumes its increase at the previous rate, 400 pulse MHz per millisecond in this example, from a starting point just below 4 GHz. This "mini" retrace in frequency is accompanied by a corresponding retrace in the horizontal sweep of the cathode ray oscilloscope, and preferably extends slightly beyond the blanking provided by the "B" pulse. The resulting slight overlap between the first and second parts of the sweep ensures that no input signal will be missed. Signals very close to 4 GHz will be displayed twice, but the displays will be physically coincident and only slightly brighter than those of other signals. The pause in the sweep lasts only about one millisecond, and is not visually perceptible as a discontinuity.

During the period between $T_B$ and $T_C$, the preselector sweeps from 4 to 8 GHz and the local oscillator sweeps from 2.1 to 4.1 GHz. The second harmonic, sweeping from 4.2 to 8.2 GHz, is at every instant 200 MHz greater than the preselector frequency. Any RF input signal of a frequency within the range of 4 to 8 GHz will be converted to IF, amplified, detected and displayed as the preselector passband sweeps through that frequency. The mixer output will contain modulation products of the local oscillator fundamental, and of local oscillator harmonics other than the second. All such products will be of frequencies widely different from the 200 MHz IF, and so will be rejected.

At time $T_C$, the "C" pulse clears the "B" flip flop and sets the "C" flip flop. The rate of change of local oscillator frequency is set at 133.3 MHz per millisecond, or one third of that of the fundamental mode of operation, and the starting frequency is just below 2.73 GHz, one third of 8.2 GHz. When the reset and blanking signals are removed at the end of the "C" pulse, the preselector sweep resumes at the original rate of 400 MHz per millisecond and is tracked by the third harmonic of the local oscillator with the constant 200 MHz difference.

The system operates otherwise as previously described, to display input signals in the range of 8 to 12 GHz. At time $T_D$, the "D" pulse clears the "C" flip flop and sets the "D" flip flop, blanking the oscilloscope and applying reset signals to the sweep generators. This condition persists until the end of the next subsequent "A" pulse, four milliseconds later, allowing sufficient time for full reset of the preselector sweep to its initial frequency of 2 GHz.

I claim:

1. A superheterodyne system for frequency scanning throughout a radio spectrum of more than one octave, including in cascade, a mixer, an intermediate frequency amplifier and a detector, and further comprising:

a. an electrically tunable local oscillator coupled to said mixer and capable of fundamental frequency operation only over a limited range of less than said spectrum, b. an electrically tunable preselector, preceding said mixer, c. a sweep signal generator for tuning said preselector to sweep cyclically throughout said spectrum, d. a sweep signal generator for tuning said local oscillator to sweep repeatedly within said limited frequency range during each preselector sweep cycle, e. a source of timing signals for controlling the timing of said preselector and local oscillator sweeps, and f. means responsive to said timing signals for controlling the slope and offset of the local oscillator sweep to maintain a predetermined intermediate frequency difference between the tuning of said preselector and respective harmonics of said local oscillator during successive sweeps of said local oscillator.

2. The invention set forth in claim 1, further including means responsive to said timing signals for controlling said sweep signal generator means to produce a brief miniature retrace of said preselector sweep at the beginning of each local oscillator sweep that starts during a preselector sweep.

3. The invention set forth in claim 1, further including means for applying a d-c bias to said mixer, and means responsive to said timing signals for controlling said bias to maximize the conversion efficiency of said mixer with said respective harmonics of said local oscillator during said successive sweeps of said oscillator.

4. The invention set forth in claim 3, further including gain control means in the signal channel following said mixer, and means responsive to said timing signals for adjusting said gain control means to compensate change in the conversion efficiency of said mixer with said respective local oscillator harmonics to maintain the overall amplitude response of the system substantially constant through said spectrum.

* * * * *